United States Patent [19]

Lill

[11] 4,143,970
[45] Mar. 13, 1979

[54] WHEEL ALIGNMENT METHOD AND APPARATUS

[75] Inventor: Melvin H. Lill, San Jose, Calif.

[73] Assignee: FMC Corporation, San Jose, Calif.

[21] Appl. No.: 833,638

[22] Filed: Sep. 16, 1977

[51] Int. Cl.² .............................................. G01B 11/26
[52] U.S. Cl. ...................................... 356/155; 356/152
[58] Field of Search ....................... 356/153, 155, 152; 33/203.18, 286

[56] References Cited

U.S. PATENT DOCUMENTS

| 3,393,455 | 7/1968 | MacMillan | 356/155 |
| 3,782,831 | 1/1974 | Senften | 356/155 |
| 3,865,492 | 2/1975 | Butler | 356/153 |

*Primary Examiner*—John K. Corbin
*Assistant Examiner*—R. A. Rosenberger
*Attorney, Agent, or Firm*—R. S. Kelly; T. J. McNaughton

[57] ABSTRACT

An improved method and apparatus for aligning the front wheels of a motor vehicle utilizing a beam projector and detector assembly on each wheel and an electronic computing means for determining the toe angles of the wheels in response to measured toe signals generated by the detectors. The computing means first subtracts one of the toe signals from the other, multiplies the difference by a selected correction factor to produce a correction signal, and then adds the correction signal to the larger of the measured toe signals and subtracts the correction signal from the smaller one to provide the true individual toe angles of the wheels. The signals derived by the computing means are applied to display devices which read out the correct values of the right and left toe angles. Although the correction factor is dependent on the dimensions of the frame of the vehicle, the steering suspension, and the mounting of the projector and detector assembly, it has been found that a correction factor of approximately 0.28 is indicated for a great portion of the United States automobile and small truck population, whereby a single alignment system incorporating the improvement herein disclosed may be used to provide accurate front-end alignment with only one adjustment of each wheel. The improved system is particularly useful when aligning vehicles having gross malalignment. Also, since the system utilizes no reference to the rear wheels of the vehicle, it provides expeditious alignment of vehicles having rear wheels which are not aligned with the front wheels, e.g., as in the case of a truck tractor or motor home with dual wheels on the rear axle.

11 Claims, 6 Drawing Figures

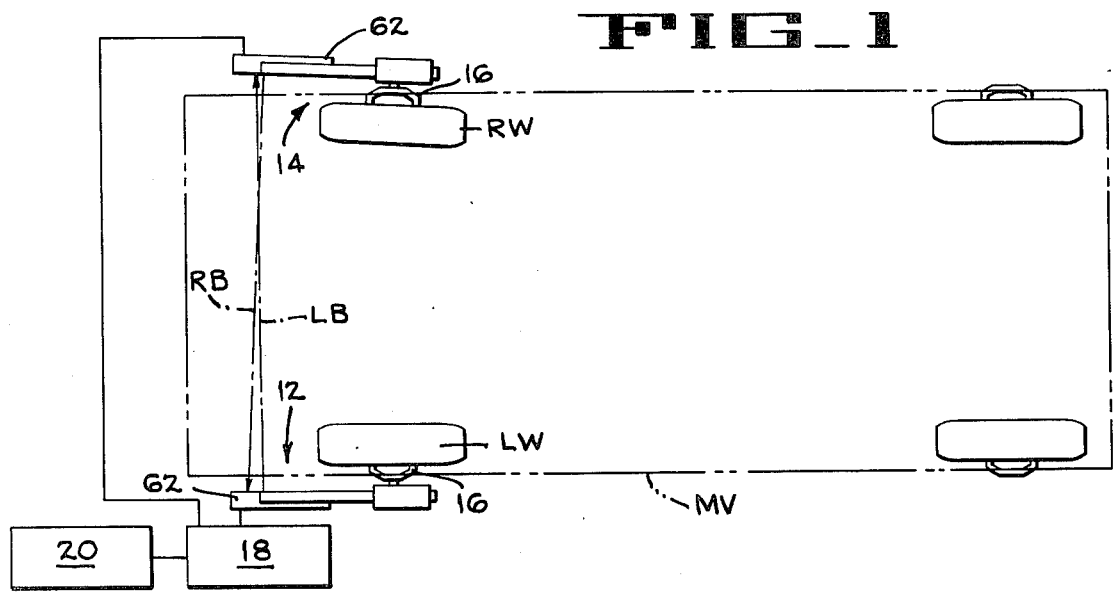
FIG_1
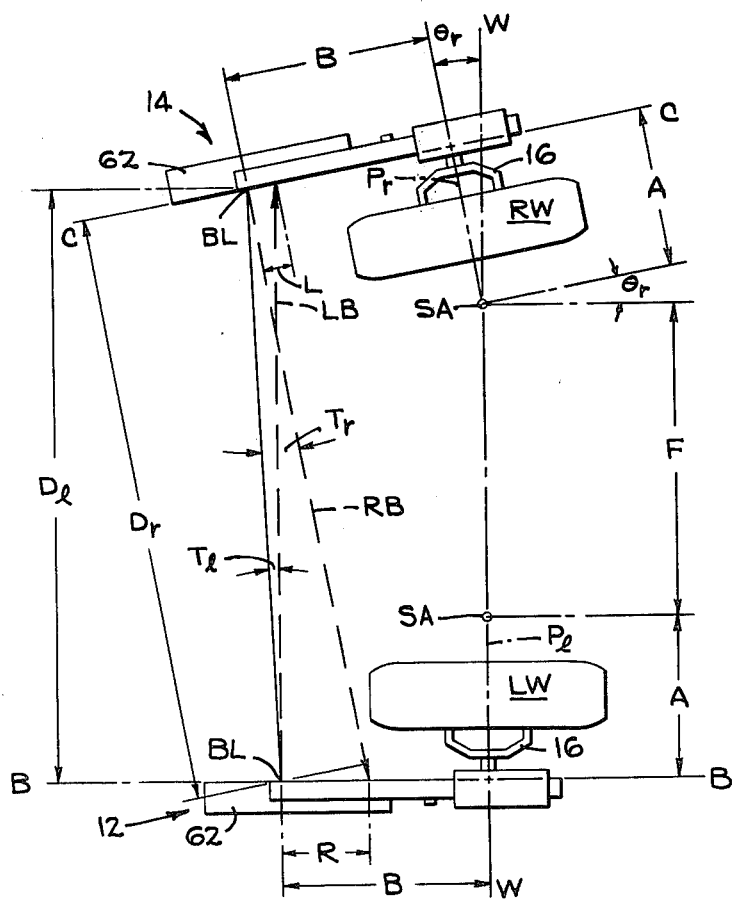
FIG_2

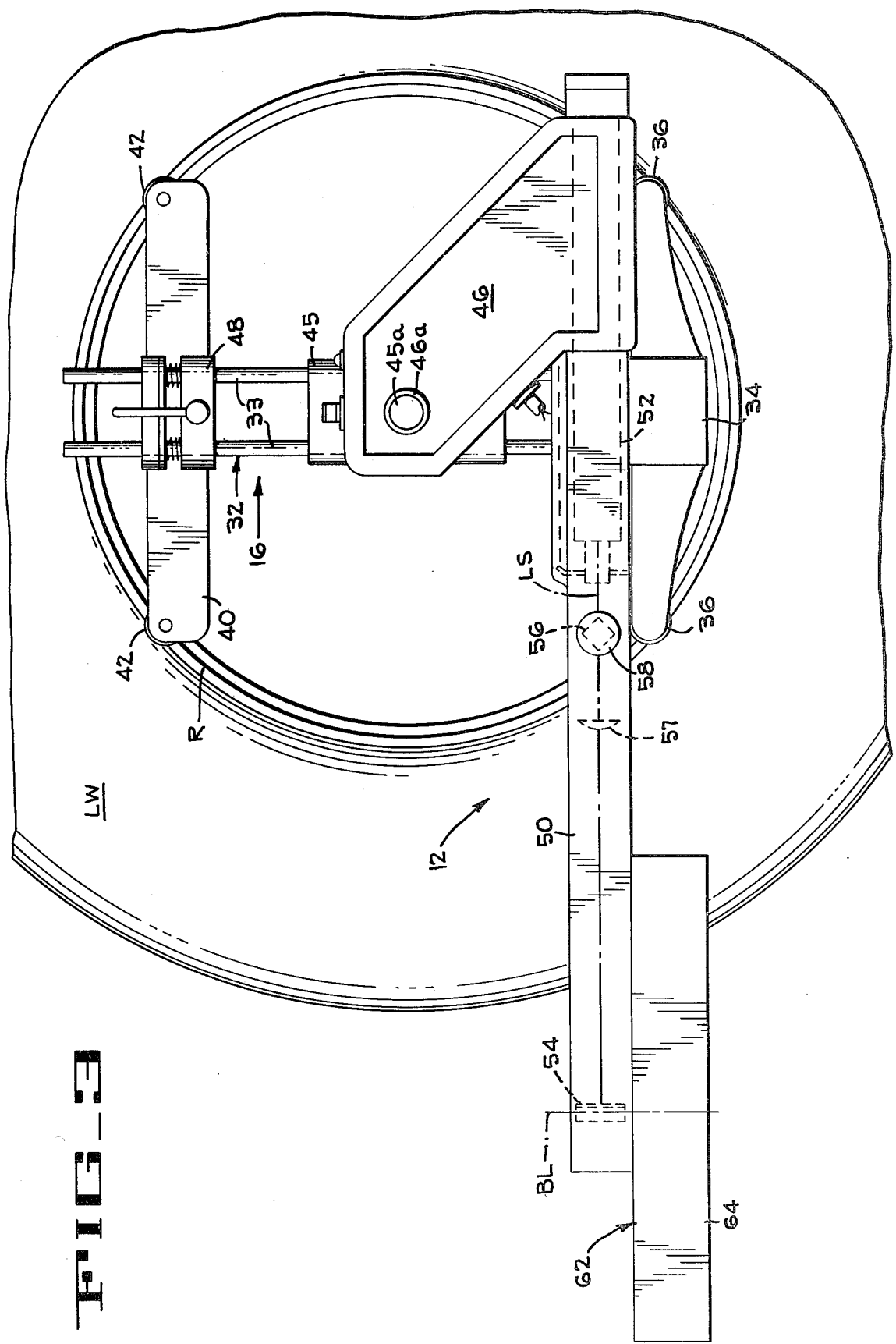

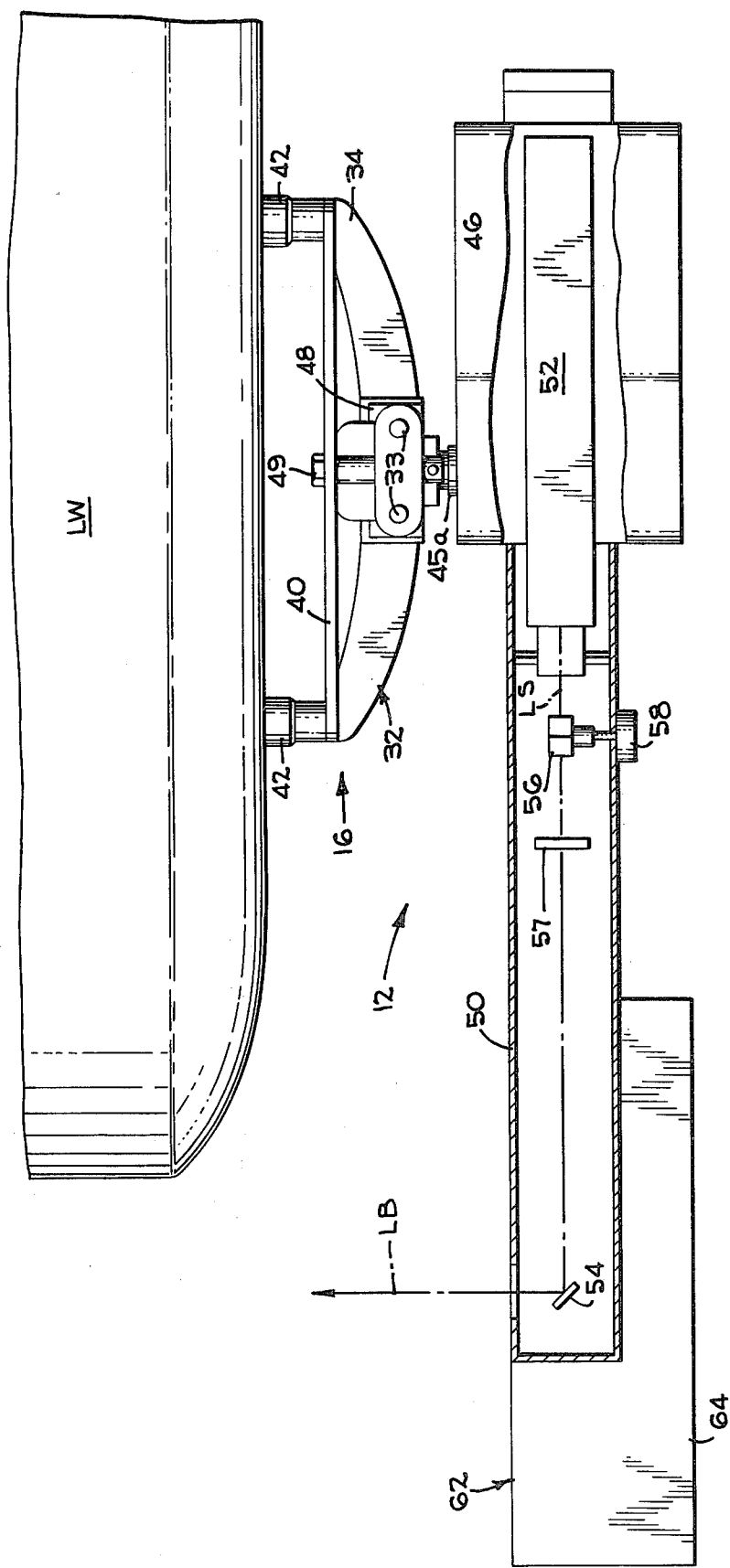

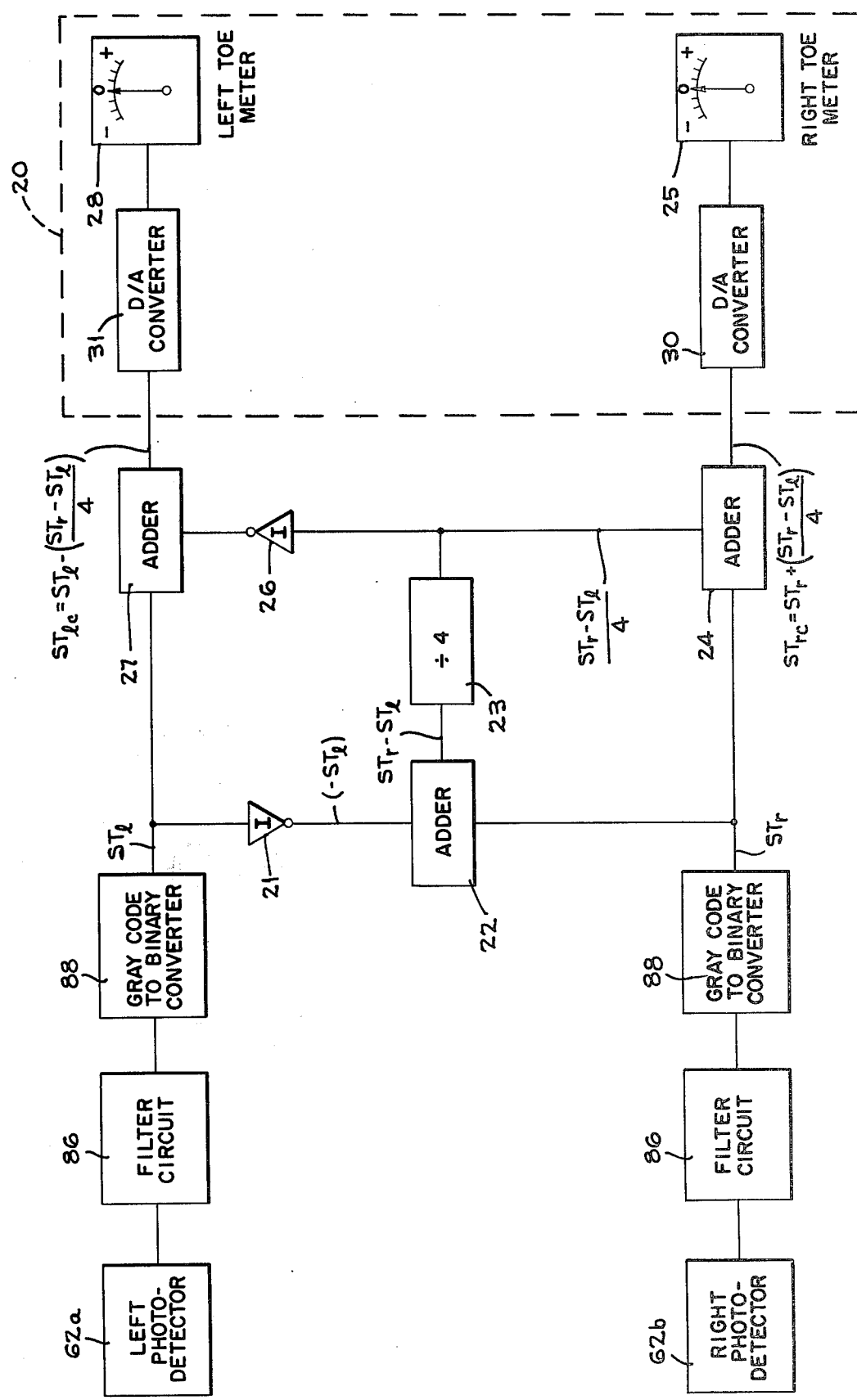

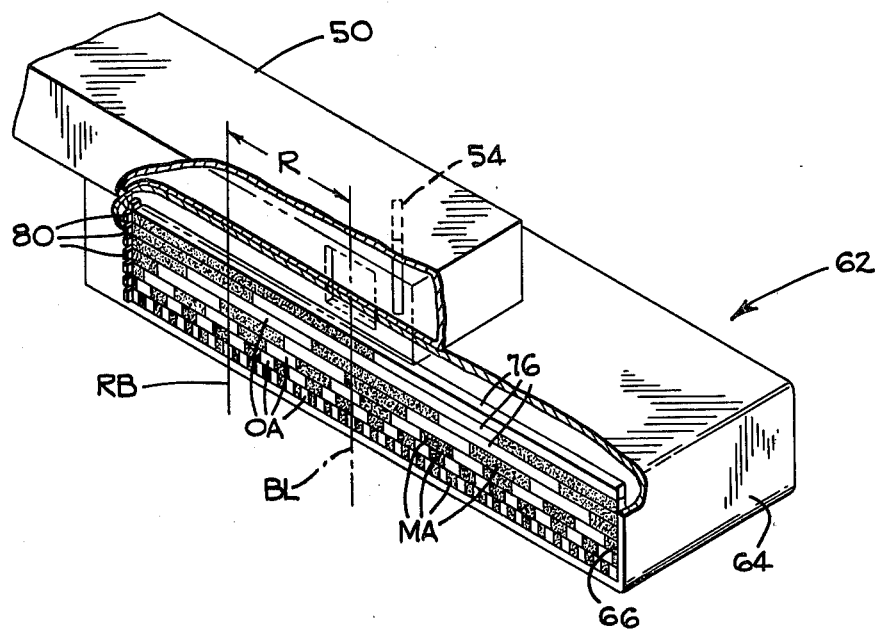
FIG_6

WHEEL ALIGNMENT METHOD AND APPARATUS

BACKGROUND OF THE INVENTION

1. Field of the Invention

The present invention generally pertains to a method and apparatus for aligning vehicle wheels, and more particularly, it pertains to a method and apparatus for measuring the correct individual toe angles of the front wheels of a vehicle.

2. Description of the Prior Art

It is necessary to the proper performance and also to the tire life of the front wheels of a motor vehicle that its front wheels be properly aligned. Accordingly, wheel alignment apparatus and methods have been devised to provide accurate measurement of the camber, caster, and toe angles of automotive vehicles, for example, to an accuracy $\pm 1/64$ in. or $\pm 1/32°$ for toe angles. Such measurements can and have been made with fairly simple instruments. However, in order to be effective, a wheel alignment system must be fast, accurate and convenient for the average mechanic, i.e., one having average skill and training, permitting its use for rapid and easy measurement during adjustment of the alignment parameters.

Before proceeding to summarize some problems of prior art systems, some alignment parameters will be briefly defined. The camber angle is recognized as the angle between the plane of a wheel and the vertical as seen from the front or rear of the vehicle. Caster angle is the angle between the steering axis of the wheel and the vertical as seen from the side of the vehicle. The angle of inclination of the steering axis is the angle between the steering axis and the vertical as seen from the front or rear of the car. As will be directly referred to in the description of the present invention, the individual toe angle, or toe, is the angle subtended between the plane of a front wheel and a vertical plane through the longitudinal centerline of the car, or, in the case where no reference to the longitudinal centerline is available, a vertical plane normal to the transverse line connecting the intersections of the wheel axis and the steering axis of each front wheel; and the total toe angle is the included angle between the planes of the two front wheels, which angle equals the sum of the individual toe angles. When the wheels have been properly aligned, the individual toe angles, i.e., right and left toe, will be equal and thus one half of the total toe. In addition, when the front wheels of the vehicle are properly aligned, the steering will be centered such that the vehicle will move straight ahead when the steering wheel is in its "dead center" position.

A typical opto-mechanical alignment system includes a pair of beam projector and target assemblies, each assembly being mounted to the outside of the rim of a front wheel such that the projector on each side directs a beam against the target of the assembly on the opposite wheel. Aligners of this sort are disclosed, for example, in U.S. Pat. Nos. 3,953,134 to Appel et al. and 3,393,455 to MacMillan. The targets or the beams include scales including lines indicative of particular angles or incremental distances which scales, for the particular vehicle involved, supposedly indicate the individual toe angle according to the location of the intersection of the beam of light projected from the opposite wheel with the target. No reference is made directly to the centerline of the car or indirectly to the centerline of the car by virtue of one or both of the rear wheels.

The foregoing alignment systems are referred to in the art as being of the cross-toe type. In brief, they measure the individual toe of a front wheel as a function of the linear translation of a beam of light from a projector mounted on the wheel with respect to a reference line in the plane of the target. It has long been noted that such systems are very inconvenient to use when gross misalignment problems are present, e.g., in cases of newly installed ball joints and other front-end suspension parts. A particular problem is that only a single measurement and adjustment of each wheel will often not yield satisfactory results when either or both of the initial individual toe angles are grossly incorrect. Even though the steering wheel is clamped so that the other wheel is undisturbed while making adjustment of the toe of one wheel, the toe reading of the other wheel will be seen to change as the adjustment is made. Thus, prior known systems often provide false individual toe readings indicating that adjustment is required for both wheels when, in fact, after consecutive adjustments it is found that one wheel needed no adjustment at all, i.e., the true value of individual toe was correct at the outset. This latter problem is vexatious when the wheel's adjustment involves the arduous, but unnecessary, task of loosening and retightening a rusted tie-rod.

More recently developed cross-toe systems utilize an electronic detection apparatus in lieu of the optical targets intended to be read directly by the operator. Some known prior art systems employing such apparatus are disclosed in U.S. Pat. Nos. 3,865,492 to Butler and 3,782,821 to Senften. Instead of a direct visual indication being provided on the target itself, the electronic systems use photosensitive elements at the target to generate signals dependent upon the angular position of light sources mounted on the wheel whose angular position is being determined. Such signals may be processed by logic circuitry to derive a further signal supposedly corresponding to the individual toe angle for the wheel. The electronic systems also include means for displaying the thus computed individual toe angles of the wheels. When the angle that is electronically displayed is that desired for the wheel being adjusted, the mechanic may then stop adjustment of that wheel and proceed to adjust the other wheel.

Even though electronic read-outs are provided, in any system in which a beam projector is mounted on one wheel directing a beam to a beam position detector on the other wheel, consecutive adjustments of the right and left front wheels still have to be made in the same manner as mentioned in connection with the discussion of the opto-mechanical wheel alignment systems. In practical terms this means that the mechanic must make an adjustment of one wheel until the electronic instrument displays the proper toe reading for that wheel. Then he will adjust the opposing wheel until its toe reading is correct or within specification. However, as soon as the second adjustment is made, it often happens that the previously adjusted toe angle for the first wheel will be incorrect, the likelihood of this happening being dependent upon the original amount of misalignment of the second wheel. The mechanic must then return to and bring the first wheel within specifications, and in so doing then find the second wheel to be incorrectly aligned. Another adjustment must then be made for the second wheel and then the alignment reading for the first wheel again checked.

It will be well appreciated that the required consecutive adjustments and readjustments as aforedescribed is physically taxing and time consuming. Furthermore, as previously indicated, it may well happen that at the outset only one wheel need be adjusted even though the initial readings of the alignment system indicate adjustment of both wheels is necessary.

SUMMARY OF THE INVENTION

It is an object of the present invention to provide an improved method and apparatus for aligning the front wheels of a vehicle which eliminate the problems or shortcomings of the prior art cross-toe wheel alignment methods and apparatus. Basically, the present invention provides means for compensating for erroneous readings from prior art cross-toe alignment apparatus and methods which errors result from the relative longitudinal displacement of the detection and projection means mounted on the opposing front wheels. According to the present invention, the amount of the error caused by such displacement is determined as a function of the difference in the toe angles indicated by the outputs of the detecting means. More specifically, the error of each reading of the toe angles directly indicated by the detecting means and the computing circuitry associated therewith is recognized as being a predetermined percentage of the difference in the readings.

In accordance with the method of the present invention, a beam of light or other radiant energy is projected from each of the front wheels of a vehicle along a path generally normal to the plane of the wheel from which it is projected such that it will intersect an opposing one of a pair of target devices mounted on the front wheels. As in known prior art alignment methods, the toe angles of the front wheels are determined according to the distance between the intersection of the centerline or reference line of the beam with the target plane and the zero reference line of the target, the left toe angle being read by the target being mounted on the right wheel and the right toe angle being read by the target mounted on the left wheel. It has been determined that such measurements are subject to translational errors, and moreover that such translational errors can be corrected by a simple process. The toe angle determined for a first one of the two wheels is subtracted from the toe angle for the second wheel. This difference is multiplied by a predetermined correction factor found to be dependent upon the frame size of the vehicle and the relationship of the zero reference line of the target with the steering axis of the wheel upon which it is mounted. The product of this multiplication is subtracted from the toe angle determined for said first wheel and added to the toe angle determined for said second wheel to thereby provide corrected values for the toe angles which are substantially equivalent to the true individual toe angles.

In the preferred embodiment of the method of the present invention, a correction factor of approximately 0.28 is employed to provide corrected toe angles for a substantial portion of the present motor vehicle population.

The apparatus of the present invention includes left and right beam projection and detection assemblies mounted to the left and right front wheels of a motor vehicle such that the beam projection portion of one of the assemblies projects a beam which strikes a detection portion of the other assembly, and vice versa. The detection portion of each assembly is adapted to provide a signal indicative of a position of the applied beam, and computing means operatively associated with the projection and detection portions of the assemblies provide an indication of the individual toe angles of each wheel. The individual toe angle signals generated are preferably applied as input signals to a further computing means which subtracts one of the signals from the other, then multiplies the difference by a predetermined correction factor to provide a correction signal, which correction signal is then subtracted from one toe angle signal and added to the other toe angle signal. The corrected toe signals may then be applied to display means for indicating the correct individual toe angles of the left and right wheels. It will be appreciated that such apparatus continuously generates corrected left and right toe readings simultaneously with the adjustment of either the left or right front wheel, whereby only a single adjustment is necessary for each of the respective front wheels.

BRIEF DESCRIPTION OF THE DRAWINGS

FIG. 1 is a diagrammatic plan view of a motor vehicle showing the apparatus of the present invention mounted on the front wheels of a vehicle.

FIG. 2 is an enlarged diagrammatic plan view of the front end of the motor vehicle of FIG. 1 illustrating the parameters of the motor vehicle and alignment system which are relevant in making a determination of the cross-toe correction factor used in the method and apparatus of the present invention.

FIG. 3 is an enlarged side elevation of the left wheel projection and detection assembly shown in FIG. 1.

FIG. 4 is a top plan, partially in section of the projection and detection assembly shown in FIG. 3.

FIG. 5 is a schematic diagram of the electrical circuitry of the apparatus of the present invention.

FIG. 6 is an enlarged isometric view of the beam detection portion of the projection and detection assembly shown in FIGS. 3 and 4.

DESCRIPTION OF THE PREFERRED EMBODIMENT

The present invention concerns an improved method and apparatus for measuring the alignment of the front wheels of a motor vehicle as noted hereinbefore. The method and the apparatus used in carrying out the method utilize measurements only of the relative angular relationships of the front wheels of a vehicle without regard to the relationship of the front wheels to the rear wheels or to any other portion of the vehicle. Stated in simplest terms, the improved alignment system of the present invention makes use of a selected correction factor for use in deriving the approximately true individual toe angles for the front wheels of the motor vehicle from measurements taken from otherwise conventional instruments mounted on the front wheels in conventional fashion. The improvement will be recognized by those skilled in the wheel alignment art to have application in cross-toe alignment systems in general, and the invention is not in any manner limited to the specific apparatus embodiment illustrated herein.

Referring now more specifically to the drawings, the apparatus of the present invention will be seen to comprise a pair of beam projection and detection assemblies 12 and 14 each of which include a mounting mechanism 16 for pivotally and removably attaching the assemblies to the left and right front wheels, LW and RW, respectively, of a motor vehicle MV. An electronic computing circuit 18 (FIG. 1) is provided for receiving signals from the detection portion of the assemblies 12 and 14 and for deriving corrected toe indication signals therefrom corresponding to true values of the left and right individual toe angles of the wheels LW and RW. A conventional display means 20 is connected to the output of the computing circuit for displaying the computed values of the toe angles, such display means comprising conventional bipolar meters 25 and 28 as shown in FIG. 5. The beam projection and detection assemblies 12 and 14 each project a beam of light toward the opposing assembly, the right assembly projecting a beam RB and the left assembly emitting a left beam LB. (FIGS. 1 and 2). Each of the assemblies 12 and 14 are mounted to their respective wheels such that the beam projected therefrom intersects the plane of the wheel from which the beam emanates at right angles, i.e., along a path generally parallel to the axis of the wheel from which a beam is projected. Finally, the assemblies 12 and 14 each include portions for detecting the beam projected from the opposite assembly and for generating an output signal corresponding to the individual toe angle of the wheel from which the beam was projected. The construction details of the projection and detection assemblies 12 and 14 will be set forth after first discussing the factors relevant to the determination of the true individual toe angles with the use of conventional cross-toe type of alignment measuring equipment and the cause of the previously mentioned erroneous readings taken by prior art cross-toe alignment equipment.

FIG. 2 illustrates a hypothetical front wheel alignment condition wherein the actual individual left toe angle (toe angle of left wheel LW), hereinafter referred to as $\theta_l$, is assumed to be zero, and the actual individual right toe angle, indicated as $\theta_r$, is positive and indicated as being of an exaggerated positive amount, that is, an amount not commonly found on actual motor vehicles. With this alignment condition, the left wheel LW is directed straight ahead relative to the centerline of the vehicle, whereby the plane of the wheel is perpendicular to a line W—W which is a horizontal line that is drawn to pass through each steering axis SA in the plane of the projection and detection assemblies 12 and 14. The steering axes SA are defined as the upright axes about which the wheels are rotated as they are steered. The right wheel RW is toed-in in a manner such that the plane thereof forms an angle of $\theta_r$ with a line perpendicular to the line W—W. It should be noted at this point that the plane upon which the lines of FIG. 2 are drawn does not necessarily intersect the axes of rotation of the wheels; in fact, in the embodiment shown the plane lies below such axes of rotation since the projection and detection assemblies 12 and 14 are below such axes as seen in FIG. 3.

As with known prior art cross-toe aligners, the beam detection portion of the left projection and detection assembly 12 receives the beam RB from the opposite assembly 14 and emits a signal which, in the past, has been generally assumed to be directly proportional to the actual individual right toe angle $\theta_r$ of the opposing right wheel RW from which the beam is sent. However, it has been found that such signal is related to but is not necessarily proportional to the true toe angle $\theta_r$. If the right projection and detection assembly 14 was oriented such that a line C—C (FIG. 2), which lies in the plane of the detection portion or target of the assembly 14, were parallel to a line B—B in the plane of the detection portion or target of the assembly 12 (i.e., both $\theta_r$ and $\theta_l$ are zero), the beam RB would impact the left assembly 12 upon a vertically extending base or zero reference line BL (FIGS. 2 and 3) which would cause the assembly 12 to emit a signal representative of an individual toe angle of zero for the right wheel RW. As the right wheel is tilted inwardly to form a greater and greater positive toe angle, the beam RB intersects the line B—B of the target of the assembly 12 at a correspondingly greater and greater distance R (FIG. 2).

In known prior art devices, including both optomechanical and fully electronic aligners of the cross-toe type which project beams of light to and from the front wheels of a vehicle, the angular displacement of one of the wheel mounted projection and/or detection devices resulting from the toe angle of the associated wheel has been discovered to sometimes introduce a translational error in the indicated toe angle reading as pointed out hereinbefore. I have discovered that a preselected and constant correction factor CF may be calculated and utilized in providing a corrected toe angle reading if the indicated toe angle reading is in error. Looking again to FIG. 2, it will be first observed that although the left wheel LW has a true toe angle of zero, the right projection and detection assembly 14 detects an excursion, L, of the intersection of the beam LB from the base line BL of the detector thereof; thus, the detector of assembly 14 would produce a reading which is erroneous. The error, in the hypothetical illustration of FIG. 2, would be directly indicated by the excursion distance L which, as can be seen, is due to the fact that the detector of assembly 14 pivots about a point SA which is laterally and longitudinally offset therefrom during rotation of the wheel RW.

The error of the reading produced in the signal directly generated from the left projection and detection assembly 12 as shown in FIG. 2 will also be readily apparent from the drawing itself. Briefly, it has been discovered that prior art systems of the type described are only accurate when the true right and left toe angles are equal. Applying this discovery to the drawing of FIG. 2, if the left wheel LW were to be toed in until the actual toe angle thereof, $\theta_l$, was equal to $\theta_r$, the intersection point of the beam RB will move farther away from the base line BL in the detection zone of the assembly 12, with the new value of excursion R then being representative of the true toe angle of the right wheel RW rather than the smaller value of R shown in FIG. 2.

When the beam projection and detection assemblies 12 and 14 are oriented relative to each other such that the base lines BL of each assembly's detector are both displaced equally to the front of the line W—W (FIG. 2) through the steering axes of the wheels, the excursions R and L in the detecting planes will be equal and the toe angles directly indicated by the detectors will thus be equal. When such a symmetrical alignment condition exists, the indicated toe angles accurately represent the true toe angles. However, when the base lines BL are not equally forwardly displaced from a transverse reference axis such as line W—W and the excursions R and L are not equal, the indicated toe angles will be erroneous. The relative longitudinal displacement of the base lines (i.e., "zero reference" marks) of the detectors is thus seen as the source of error. The angles indicated by the detectors when such a condition exists can be considered, according to the present invention, as merely first order approximations of the true toe angles.

In summary, I have found that when the readings of the cross-toe alignment devices are not equal, the greater measured toe angle is actually smaller than the true individual toe angle for the associated wheel, and the smaller measured toe angle is actually larger then the true toe angle for the associated wheel. The correction factor CF is provided by the present invention in order to calculate a single increment by which the smaller reading may be decreased and the larger reading may be increased such that the resulting corrected readings will approximate what the readings should actually be to indicate the respective true toe angles of the wheels.

Moreover, I have found that a single correction factor may be used in cross-toe alignment systems to enable the systems to correctly measure toe angles for a large portion of the motor vehicle populations, thereby enabling computation of approximately correct toe angles without changing the correction factor for the different individual vehicle types.

The relevant angles and distances illustrated in FIG. 2 which are useful in analyzing the present invention are as follows: F is the frame width between the intersections of the steering axes SA; A is the lateral offset distance from the steering axes of the front wheels to a line B—B or C—C in the plane of the surface of the target or detection zone, such distance being measured along a line $P_l$ or $P_r$ extending from the respective steering axis SA so as to be perpendicular to the corresponding line B—B or C—C; B is the distance of longitudinal offset of the zero reference line BL of the detection zone from the aforementioned lines $P_l$ or $P_r$, such distance B being measured along line B—B or C—C; R is the linear excursion of the beam RB from the base line BL as measured along the line B—B in the plane of the target of alignment assembly 12; L is the corresponding linear excursion of the beam LB from the base line BL in the plane C—C of the alignment assembly 14; $D_r$ is the projection distance from the assembly 14 measured along a line perpendicular to the plane C—C and extending to the base line BL of the alignment assembly 12; $D_l$ is the corresponding projection distance from the plane B—B of the alignment assembly 12 to the base line BL of the opposite assembly 14; $T_r$ is the angle represented by the right toe signal generated by the assembly 12, such angle being shown as that subtended by the beam RB and the line between the base lines BL of the alignment assemblies; and $T_l$ is the corresponding angle represented by the left toe signal produced by the assembly 14, such angle being subtended by the beam LB and the line between the base lines BL.

A fairly universal correction factor CF has been determined for a large portion of the motor vehicle population, to include sport vehicles, small imported sedans, domestic intermediate sized sedans, large domestic sedans, sport vans, and pick-up truck units. Table I sets forth the relevant chassis related parameters F, A, and B (see FIG. 2) for such vehicles utilizing conventional cross-toe alignment mechanisms such as 12, 14 described hereinbefore.

TABLE I

| Chassis-Related Parameters | $\theta_r$ | $T_r$ | $T_l$ | CF | $T_{rc}$ at CF = .28 | $T_{lc}$ at CE = .28 |
|---|---|---|---|---|---|---|
| (Mini-Sport) | | | | | | |
| F = 38" | .1° | .08016° | .01984° | .3289 | .09705° | .00295° |
| A = 12 1/2" | .2 | .16039 | .03960 | .3279 | .19421 | .00578 |
| B = 16 7/16" | .4 | .32090 | .07918 | .3272 | .38859 | .01150 |
| $\theta_1 = 0$ | .8 | .64226 | .15782 | .3256 | .77790 | .02218 |
| (Small Sedan) | | | | | | |
| F = 44" | .1 | 0.8191 | .01811 | .2835 | .09977 | .00025 |
| A = 12 1/2" | .2 | .16380 | .03615 | .2836 | .19954 | .00041 |
| B = 16 7/16" | .4 | .32780 | .07228 | .2826 | .39935 | .00073 |
| $\theta_1 = 0$ | .8 | .65596 | .14405 | .2814 | .79929 | .00072 |
| (U.S. Intermediate) | | | | | | |
| F = 50" | .1 | .08208 | .01793 | .2793 | .10004 | −.00003 |
| A = 14" | .2 | .16415 | .03587 | .2795 | .20007 | −.00005 |
| B = 16 7/16" | .4 | .32839 | .07158 | .2788 | .40030 | −.00033 |
| $\theta_1 = 0$ | .8 | .65726 | .14280 | .2775 | .80131 | −.00125 |
| (Large Sedan) | | | | | | |
| F = 56" | .1 | .08331 | .01665 | .2504 | .10197 | −.00201 |
| A = 14" | .2 | .16668 | 0.3331 | .2498 | .20402 | −.00403 |
| B = 16 7/16" | .4 | .33352 | .06646 | .2489 | .40830 | −.00832 |
| $\theta_1 = 0$ | .8 | .66743 | .13262 | .2479 | .81718 | −.01713 |
| (Sport-Van) | | | | | | |
| F = 56" | .1 | .08043 | .01956 | .3215 | .09747 | .00252 |
| A = 18" | .2 | .16090 | .03907 | .3201 | .19501 | .00496 |
| B = 16 7/16" | .4 | .32189 | .07813 | .3204 | .39014 | .00988 |
| $\theta_1 = 0$ | .8 | .64415 | .15590 | .3192 | .78086 | .01919 |
| (Truck Unit) | | | | | | |
| F = 70" | .1 | .08181 | .01818 | .2859 | .09963 | .00036 |
| A = 20" | .2 | .16367 | .03633 | .2853 | .19933 | .00067 |
| B = 22 7/16" | .4 | .32747 | .07256 | .2845 | .38884 | .00119 |
| $\theta_1 = 0$ | .8 | .65532 | .14475 | .2834 | .79828 | .00179 |

It will be appreciated from Table I that the application, according to the present invention, of a correction factor CF of 0.28 yields sets of corrected toe values $T_{rc}$ and $T_{lc}$ for the vehicles indicated which are corrected to within a range of one-half to three percent from the actual, or true, toe angle values $T_r$ and $T_l$. This range of variance is sufficiently accurate since the desired alignment specifications usually permit a ± 1/32° error for each wheel. Thus, the present invention is applicable for the great majority of the vehicles presently in use.

The derivations used to provide the data of Table I are as follows:

$$R = B - (A \sin \theta_r + B \cos \theta_r) + \text{TAN } \theta (A + F + A \cos \theta_r - B \sin \theta_r) \quad \text{(Eq. 1)}$$

or $$R = (A + F) \text{TAN } \theta_r - B \cos \theta_r (1 - \cos \theta_r) \quad \text{(Eq. 1A)}$$

and $$\frac{L = A \sin \theta_r + B \cos \theta_r - B}{\cos \theta_r} = \quad \text{(Eq. 2)}$$

$$A \text{ TAN } \theta_r - B\left(\frac{1}{\cos \theta_r} - 1\right)$$

The value of the projection distances $D_l$ and $D_r$ may be derived as follows:

$$D_l = A + F + A \cos \theta_r - B \sin \theta_r \quad \text{(Eq. 3)}$$

$$\frac{D_l}{\cos \theta_r} - R \sin \theta_r \quad \text{(Eq. 4)}$$

Finally, the angles represented by the right and left toe signals $T_r$ and $T_l$, respectively, as generated by the alignment assemblies 12 and 14, respectively, are represented by $$T_r = \text{ARCTAN} \frac{R \cos \theta_r}{D_r} \quad \text{(Eq. 5)}$$

$$T_l = \text{ARCTAN} \frac{L \cos \theta_r}{D_l} \quad \text{(Eq. 6)}$$

A correction factor for the various vehicles at the respective toe angles shown in Table 1 can be derived according to the following Equation:

$$CF = \frac{\theta_r - T_r}{T_r - T_l} \quad \text{(Eq. 7)}$$

From the foregoing, I have found that by multiplying the difference in the indicated toe angle signals (i.e., $T_r - T_l$) by a factor of $CF = 0.28$, then adding the value obtained to $T_r$ and substracting it from $T_l$, individual toe angle values can be generated which are correct to within approximately 3% of the true values. Thus, a constant correction factor of 0.28 may be used to provide automatically the necessary corrections in conventional cross-toe alignment systems.

To use the correction factor in determining the approximate true toe angles for a vehicle, the difference between the left and right toe angle readings of the left and right assemblies 12 and 14 is determined, this difference is multiplied by the correction factor, and the resultant product is subtracted from the smaller of the readings and added to the larger of the toe reading. The following formulae define the relationships of the measured individual right and left toe angles, $T_r$ and $T_l$, and the corresponding corrected right and left toe angles, $T_{rc}$ and $T_{lc}$:

$$T_{rc} = T_r - CF(T_l - T_r) \quad \text{(Eq. 8)}$$

and $$T_{lc} = T_l + CF(T_l - T_r) \quad \text{(Eq. 9)}$$

A schematic diagram illustrating the circuitry necessary to make such calculations upon the toe angle signals produced by photosensitive type detection means is set forth in FIG. 5. While it has been indicated that an average correction factor (CF) of approximately 0.28 is desirable, a correction factor of 0.25 is used in the circuitry disclosed in order to simplify the same. The photodetector devices 62a and 62b, the filter circuits 86, and the gray code to binary converters 88, shown in FIG. 5, will be hereinafter described. The signals $ST_l$ and $ST_r$ issuing from the converters 88 are subtracted from each other by applying the left toe signals $ST_l$ to an inverter 21 and then applying the inverted signal and the right toe signal $ST_r$ to a binary adder circuit 22. The output of the adder 22 will comprise a remainder signal corresponding to $ST_r - ST_l$. This remainder signal is applied to a divide-by-four circuit 23 consisting of two conventional divide-by-two circuits connected in series. The divider circuit 23, in effect, accomplishes a multiplication by the correction factor of 0.25. The output signal of the divider 23 is applied to an adder circuit 24 together with the signal $ST_r$ to produce a corrected right toe signal $ST_{rc}$. This signal is applied to a conventional digital-to-analog converter 30 with the output thereof being directed to the meter 25 that indicates the correct toe angle in degrees. The signal from the divide-by-four circuit 23 is also inverted by an inverter 26 and applied to a further adder circuit 27 along with the left toe signal $ST_l$. The adder circuit 27 thereby provides the corrected left toe signal $ST_{lc}$ representing the true left toe angle $\theta_l$. The corrected left toe signal $ST_{lc}$, in digital form, is applied to a conventional digital-to-analog converter 31 the output of which drives the display meter 28. Thus it will be apparent that the circuitry of FIG. 5 automatically provides analog outputs representing the corrected toe angles according to Equations 8 and 9.

It should be noted at this point that the basic electronic circuitry of FIG. 5, will be applicable to a wide variety of cross-toe alignment apparatus having opposing beam projection and detection devices, wherein each such device produces an individual toe reading signal corresponding to the angular or linear displacement between reference axes associated with the beam and with the detection zone. The illustrated embodiment of the alignment assemblies 12 and 14 should accordingly be perceived as merely an illustration of one such electronic cross-toe system for producing such signals and should not be deemed to limit the present invention in any way.

A suitable construction for the mounting mechanisms 16 of the beam projection and detection assemblies 12 and 14 is shown in U.S. Pat. No. 3,709,451 issued Jan. 9, 1973 to Edward T. Graham, which patent is assigned to the Assignee of the present invention. The mounting mechanism disclosed therein firmly mounts an alignment tool to the rim R of a motor vehicle wheel such that the alignment tool may be oriented parallel to the plane of the rim and, thus, to the plane of the wheel. Each of the mounting mechanisms 16 of the present invention, as shown particularly in FIGS. 3 and 4, comprise a supporting arm 32 offset from the plane of the rim and defined by a pair of spaced parallel rods 33. One end of each rod 33 is rigidly secured through a cross bar 34 which has spaced elongated fingers 36 rigidly connected to its outer ends. The fingers 36 are spaced at equal distances on opposite sides of the supporting arm 32 and are normal to and project a substantial distance from a plane containing the rods 33. A clamping device 48 is slidably received on the opposite ends of the rods 33 so that the mounting mechanism can accommodate wheels of different diameters. A clutch mechanism, described in the aforementioned U.S. Pat. No. 3,709,451, may be used to lock the clamping device 48 on the rods 33 in any selected position. A cross bar 40 is pivotally connected at its midpoint to the body of the clamping device 48 by a shouldered screw 49. A pair of fingers 42 are secured to the ends of the cross bar 40 and extend outwardly therefrom in a direction parallel to the aforementioned fingers 36. The fingers 36 and 42 are of sufficient length to maintain the supporting arm 32 in a plane that is disposed outwardly of the wheel rim R and is parallel to the plane of the wheel rim when the ends of the fingers are clamped to the rim. The mounting mechanisms 16 further include a supporting slide 45 to which the body of the assemblies 12 and 14 are pivotally mounted. This is accomplished by means of a stub shaft 45a rigidly attached to the face of the slide 45 and projecting outwardly at right angles thereto. The slide 45 is set at a selected location along the rods 33 so that the axis of stub shaft 45a exactly coincides with the rotary axis of the wheel upon which the alignment assembly is mounted.

The beam projection and detection assemblies 12 and 14 are essentially the same as those illustrated in co-pending United States Patent application Ser. No. 773,638, filed Mar. 3, 1977 by Thomas E. Roberts, Jr. et al and entitled Wheel-Mounted Vehicle Wheel aligner; the disclosure of this co-pending application is incorporated by reference herein and, accordingly, reference may be made thereto for further details on the construction and operation of the beam projection and detection assemblies 12 and 14.

The alignment assemblies 12 and 14 each include a housing 46 having a sleeve 46a which is journalled about the shaft 45a projecting from the supporting slide 45. The housing 46 is thereby adapted to swing freely about the axis of the shaft 45a which axis coincides with the axis of rotation of the wheel to which it is mounted; thus, as the wheel is rotated the housing remains in a generally stationary position. A barrel housing member 50 is engaged and supported in a horizontal position by the lower end of the housing 46. The barrel housing member 50 contains a laser 52 which provides a laser beam LS. This beam is directed along the axis of the housing to a mirror 54 mounted at the forward end thereof. The mirror 54 has a specular surface of a flat configuration and a special orientation so as to reflect the laser beam LS toward the target of the opposing alignment assembly. Thus, as shown in FIG. 4, the laser beam from the left alignment assembly 12 directs a left beam LB to the target on the right alignment assembly 14.

A beam-spreading optical system is mounted between the laser 52 and the mirror 54 to cause the laser beam LS to be repetitively swept in a generally vertical plane before it strikes the mirror 54. A preferred embodiment of such a system is shown in the aforementioned co-pending Roberts et al patent application Ser. No. 773,638. This embodiment includes a prism 56 having a square external configuration which is positioned near the laser 52 with its axis lying at right angles to the projected laser beam LS, as shown in FIGS. 3 and 4. The prism 56 is affixed to a shaft which is driven by a motor 58 so that the prism rotates about said axis at a predetermined speed. The optical system further includes a plano-cylindrical lens 57 mounted between the prism 56 and the mirror 54. The incident face of the lens is planar and vertically oriented, and its emergent face is cylindrical and has an axis of revolution which intersects the centerline of the laser beam. As will be understood by those skilled in the art, the prism 56 refracts the laser beam up and down and across the emergent face of the lens 57; and the lens 57, by having its focal point situated at a selected distance from the mirror 54, positions the upper and lower limits of the reflected laser beam upon the surface of the mirror 54.

Each of the alignment assemblies 12 and 14 further includes a photosensitive detection element, or detector, 62 mounted to the forward end of the barrel housing member 50. It should be noted that both the mirror 54 of the beam projection portion of the alignment devices and the detection element 62 are mounted to the front of the front wheels LW and RW so as to provide unobstructed paths for the beams LB and RB projected across the front of the vehicle. Thus, detectors 62 are secured to the underside of the forward end of the barrel housing 50 beneath the mirror 54, as shown in FIG. 3. It should be noted at this point that the alignment assemblies 12 and 14 are constructed and balanced such that they will hang from their associated mounting tools 16 in horizontal orientations, as shown in FIG. 3.

Each detector 62 (shown in detail in FIG. 6) includes a housing 64 having a generally rectangular opening 66 at one side thereof which defines the outline of the target zone in the detection planes C—C or B—B (FIG. 2). A plurality of light pipes 76 are mounted within the opening 66 in mutually abutting and horizontally disposed positions with the active, or light receptive, faces thereof facing out of the opening. At the end of each of the light pipes there is a photosensitive cell 80, each cell being adapted to provide an electrical signal to indicate the reception within the light pipe of the light beam LB or RB which periodically sweeps upwardly and downwardly across the detector. The active surfaces of the light pipes are provided with a pattern of open areas OA and masked areas MA—the open areas permitting light to be transmitted into the light pipe and along the axis thereof and the masked areas blocking the entry of light into the light pipe. It will be understood that the light pipe pattern (as shown in FIG. 6) represents a Gray Code optical pattern so that the resultant electrical output signals from the photocells 80 will be a Gray Code binary output. The binary signals thus produced by the plurality of photocells 80 are transmitted to the respective Gray Code to binary converter 88 (see FIG. 5) for processing in the manner previously pointed out.

The detection or target zone defined by the opening 66 includes the base, or zero reference, line BL which extends vertically therethrough, as indicated schematically in FIG. 6. It will be understood that the base line BL is used as the basis from which all measurements are computed in the horizontal plane. When the vertically sweeping beam LB or RB impinges on the segmental area (i.e., the smallest increment thereof) lying on the base line, the detector 62 will generate a combination of binary ones and zeroes which will indicate a "zero" toe angle reading. The base line is located directly below the mirror 54 of the associated light projector such that when the assemblies 12 and 14 are each at a zero toe angle, the beams RB and LB will lie in a common vertical plane. As the toe angles change the received beams RB and LB will move horizontally relative to the base lines BL. As seen in FIG. 6, the beam RB is deflected the distance R which distance can be computed in accordance with the binary signals produced when the beam RB illuminates those light pipes exposed in the detection plane along line RB.

Details of the function and operation of the light pipes 76 are set forth in the aforementioned copending Roberts et al. patent application Ser. No. 773,638 wherein it is noted that the pipes are preferably formed of a clear plastic, such as Lucite, or other material having a high index of refraction and which contains a plurality of light scattering centers. The pipes may have their inactive surfaces covered with an opaque paint to prevent transmission of light between the adjacent pipes.

Ambient light may cause the light pipes 76 to produce spurious signals which could interfere with the desired output signals therefrom. However, it will be recalled that the light beams LB and RB periodically sweep across the face of the target area of the detectors 62. This oscillation causes each photocell 80 of each detector to develop an output signal frequency corresponding to the frequency of oscillation of the associated light beam. Conventional filter circuits 86 (FIG. 5) receive the output signals of the cells 80 to eliminate spurious signals which might be developed by the ambient light conditions.

The remainder of the electronic circuitry of the present invention has been described hereinbefore. In summary, the signals emitted from the converters 88 comprise the measured right and left toe signals $ST_r$ and $ST_l$, which signals are subtracted from each other to provide a remainder signal $(ST_r - ST_l)$, the remainder signal being multiplied by the selected correction factor CF, and the product signal $(ST_r - ST_l)/4$ of the multiplication being added to the measured signal representative of the greater toe angle and said product signal being subtracted from the measured signal representative of the smaller toe angle. The thus corrected signals $ST_{rc}$ and $ST_{lc}$ are applied to the display devices 25 and 28 to indicate the correct toe angles of the wheels LW and RW.

It should be noted at this point that the relationships of the measured and corrected toe angles, as set forth in Equations 8 and 9, can be summarized by the statement that the corrected toe angles correspond to the measured toe angles with adjustments being made thereto in accordance with a predetermined percentage of the difference between the measured angles. More specifically, an incremental angle is added to the larger of the measured angles and subtracted from the smaller of the measured angles, and such incremental angle represents a determinate share of the difference between the measured angles. Accordingly, the circuitry of FIG. 5 is intended to illustrate only a preferred embodiment showing a chosen sequence of mathematical operations on the input signals from the detection devices; other sequences, and thus other circuits, will become obvious to those skilled in the art.

It will be appreciated that an important advantage of the apparatus of the present invention is that the "displayed" toe angles are always substantially correct. Thus, the output readings will always be substantially correct even though such readings may be continuously changing such as when adjustments are being made to the wheel alignment. Compensation for the translational error of a toe angle is made simultaneously with the change of such error induced by the adjustment of one or both of the wheels. Moreover, if a wheel's initial toe angle is within specification, the apparatus properly indicates this fact, irrespective of the relative toe angle of the other wheel. The possibility that the displayed toe angles will indicate that a wheel's alignment should be changed when it is not necessary is thus preempted. Another significant advantage of the electronic alignment system of the present invention is that both wheels may be adjusted simultaneously by two mechanics, because the readings for both wheels will be correct no matter how rapid adjustments are made by either of the two mechanics working on the car.

As is well known by those skilled in the wheel alignment art, it is extremely difficult, if not sometimes impossible, to mount beam projection apparatus to the rims of wheels such that the beam projected therefrom will intersect the plane of the wheel at right angles therewith. Accordingly, the projected beam will typically generate a conical surface of revolution as the wheel is rotated. The beam will generate what is commonly referred to as a "run-out circle" on the target of the detection means, or, in the case of the beam projection apparatus described herein, a "run-out excursion" in the horizontal plane. At any given rotational position of the wheel, the position of the beam in the "run-out excursion" will be a horizontal distance along the plane of the target from a centered position where it would be if the beam extended parallel to the rotary axis of the associated wheel. Compensation for this alignment error, referred to as run-out, may be obtained by recording a first value of the horizontal deflection when the wheel is in one rotative position, rotating the wheel 180° to obtain another rotative position to get a second value, and then averaging the two values. This may be done by hand, or it may be done automatically by electronic circuitry incorporated into the computing circuitry 18.

The improved method of the present invention may be utilized with cross-toe alignment systems of most any type utilizing beam projection and detection apparatus mounted to the front wheels in opposed relationship, particularly the electronic type of system where the individual toe angles are automatically computed. The method comprises the following steps. Beam projection and detection assemblies are removably mounted to the front wheels of a motor vehicle such that the beams projected by the opposing assemblies are generally normal to the plane of the wheel from which they are projected and intersect the detection portion of the opposing assembly. First order approximations of the toe angles of the front wheels are determined in accordance with the normal and conventional operation of such assemblies. The value of a first one of the first order approximations is subtracted from the corresponding value determined for the other approximation. This difference is then multiplied by a translational error correction factor, which correction factor is dependent upon the lateral offset distance between the plane of a target and the steering axis about which such target is moved, the distance between the intersections of the steering axes of the wheels, and the longitudinal offset distance between the reference position of the target and the steering axis. The product of the foregoing multiplication is then subtracted from the first of the first order approximations and added to the other of the first order approximations to provide the actual individual toe angles for the respective wheels.

Although the best mode contemplated for carrying out the present invention has been herein shown and described, it will be apparent that modification and variation may be made without departing from what is regarded to be the subject matter of the invention.

What is claimed is:

1. An improved wheel alignment system including means removably mounted to each of the front wheels of a motor vehicle for projecting a beam of light from said wheel, each of said beams being projected generally toward the opposing wheel along a path which is generally normal to the plane of the wheel from which said beam is projected, means mounted to each of said wheels for detecting the position of the beam projected from the opposing wheel, computing means operatively associated with said beam projecting and detecting means for providing individual wheel toe angle signals, and display means responsive to the signals from said computing means for indicating the toe angles of said front wheels, wherein the improvement comprises: further computing means responsive to said toe angle signals for generating a correction signal representative of a preselected percentage of the difference in magnitudes of said toe angle signals; and means responsive to said correction signal for modifying said toe angle signals to compensate for any errors in said toe angle signals resulting from the longitudinal displacement of the base reference plane of one of said detecting means from the base reference plane of the other of said detecting means due to rotation of the wheels about their steering axes.

2. The improved apparatus of claim 1 wherein said preselected percentage is approximately 0.28.

3. The improved apparatus according to claim 1 wherein said preselected percentage is 25%, whereby said correction signal may be derived by a division-by-four circuit.

4. An improved wheel alignment system including means removably mounted to each of the front wheels of a motor vehicle for projecting a beam of light, each of said beams being projected along a path which is generally normal to the plane of the wheel from which said beam is projected, means removably mounted to each of said wheels for detecting the position of the beam projected from the opposing wheel, means for issuing a toe indication signal for each wheel corresponding to the angular or linear displacement between reference axes associated with the beam projecting means and the detecting means, and display means responsive to said signals for indicating the toe angles of said front wheels, wherein the improvement comprises: means for subtracting one of said toe indication signals from the other of said toe indication signals to produce a remainder signal; means for multiplying said remainder signal by a preselected correction factor to produce a correction signal; means for subtracting said correction signal from said one of said toe indication signals to produce a corrected toe signal which when applied to said display means will generate a displayed toe angle substantially equivalent to the actual toe angle of the associated wheel; and means for adding said correction signal to said other of said toe indication signals to thereby produce a corrected toe signal which when applied to said display means will generate a displayed toe angle substantially equivalent to the actual toe angle of the associated wheel.

5. The improved wheel alignment system according to claim 4 wherein said correction factor is approximately 0.28.

6. The improved system of claim 4 wherein said correction factor equals 1/4.

7. An apparatus for measuring the toe angles of the left and right front wheels of a motor vehicle comprising:
    means mounted to a first one of said front wheels for projecting a beam of radiant energy generally toward the other front wheel along a path which is generally normal to the plane of said first wheel;
    means mounted to the other of said front wheels for projecting a beam of radiant energy generally toward said one wheel along a path which is generally normal to the plane of said other wheel;
    means mounted to said other wheel for detecting said beam projected from said one wheel;
    means mounted to said one wheel for detecting said beam projected from said other wheel;
    computing circuitry means responsive to said projecting means and said detecting means for providing first and second toe indication signals representative of the individual toe angles of said front wheels;
    means for deriving modified first and second toe indication signals which are substantially directly proportional to the actual toe angles of said front wheels, said last named means including:
    means for subtracting said first toe indication signal from said second toe indication signal to produce a remainder signal;
    means for multiplying said remainder signal by a selected correction factor to produce a correction signal;
    means for subtracting said correction signal from said first toe indication signal to produce a modified first toe indication signal;
    means for adding said correction signal to said second toe indication signal to produce a modified second toe indication signal;
    means responsive to said modified first toe indication signal for displaying the toe angle of said one wheel; and
    means responsive to said modified second toe indication signal for displaying the toe angle of said other wheel.

8. The apparatus of claim 7 wherein said correction factor is approximately 0.28.

9. The apparatus of claim 7 wherein said correction factor equals 1/4.

10. An improved method for determining the toe angles of the front wheels of a vehicle of the type including the steps of projecting a first beam from a first front wheel generally toward the opposing second front wheel along a path generally normal to the plane of said first wheel, projecting a second beam from said second wheel toward the first wheel along a path generally normal to the plane of said second wheel, detecting the positions of said first and second beams in planes adjacent and generally parallel to said second and first wheels respectively, determining the toe angle of said first wheel according to information from said first beam and its detection in said plane adjacent said second wheel, and determining the toe angle of said second wheel according to information from said second beam and its detection in said plane adjacent said first wheel, wherein the improvement comprises the steps of: subtracting the toe angle determined for said first wheel from the toe angle determined for said second wheel; multiplying the remainer of said subtraction by a selected correction factor; subtracting the product of said multiplication from the toe angle determined for said first wheel to thereby produce a corrected toe angle substantially equivalent to the actual toe angle of said first wheel; and adding the product of said multiplication to the toe angle determined for said second wheel to thereby produce a corrected toe angle substantially equivalent to the actual toe angle of said second wheel.

11. An improved method for determining the toe angles of the front wheels of a vehicle of the type including the steps of projecting a first beam from a first front wheel generally toward the opposing second front wheel and projecting a second beam from said second wheel towards said first wheel, detecting the positions of said first and second beams adjacent said second and first wheels respectively, determining the toe angle of said first and second wheels according to information from said beams and their detection, wherein the improvement comprises the steps of: determining an incremental angle according to a determinate portion of the difference of said toe angles; increasing the larger of said toe angles by the amount of said incremental angle to thereby yield a modified toe angle which is substantially equivalent to the actual toe angle of the wheel having the larger of said toe angles; and decreasing the smaller of said toe angles by the amount of said incremental angle to thus obtain a modified toe angle which is substantially equivalent to the actual toe angle of the wheel having the smaller of said toe angles.

* * * * *

UNITED STATES PATENT OFFICE
CERTIFICATE OF CORRECTION

Patent No. 4,143,970     Dated March 13, 1979

Inventor(s) MELVIN H. LILL

It is certified that error appears in the above-identified patent and that said Letters Patent are hereby corrected as shown below:

Column 8, line 31, in Table 1 (Small Sedan) under Tr; F=44" "0.8191" should be --.08191--

Column 9, line 15 --Dr = -- should precede "$\dfrac{D1}{\cos\theta r}$"

Column 11, line 44 "special" should be --spacial--

Signed and Sealed this

Twenty-seventh Day of May 1980

[SEAL]

Attest:

SIDNEY A. DIAMOND

Attesting Officer     Commissioner of Patents and Trademarks

UNITED STATES PATENT AND TRADEMARK OFFICE
CERTIFICATE OF CORRECTION

PATENT NO. : 4,143,970

DATED : March 13, 1979

INVENTOR(S) : MELVIN H. LILL

It is certified that error appears in the above—identified patent and that said Letters Patent is hereby corrected as shown below:

Column 8, last line, change the quantity $B \cos\theta r$ to $\frac{B}{\cos\theta r}$.

Column 9, line 4, delete the line appearing under the letter L and the equality symbol (=) in Equation 2.

Signed and Sealed this

*Tenth* Day of *March 1981*

[SEAL]

*Attest:*

RENE D. TEGTMEYER

*Attesting Officer*  *Acting Commissioner of Patents and Trademarks*